United States Patent
Ketels et al.

(10) Patent No.: US 10,479,234 B2
(45) Date of Patent: Nov. 19, 2019

(54) ACTUATOR FOR AN OCCUPANT SUPPORT

(71) Applicant: Faurecia Automotive Seating, LLC, Auburn Hills, MI (US)

(72) Inventors: Cedric Ketels, Auburn Hills, MI (US); Jeffery T. Bonk, Chesterfield, MI (US); Tristan Vanfossen, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/018,816

(22) Filed: Jun. 26, 2018

(65) Prior Publication Data

US 2018/0370391 A1  Dec. 27, 2018

Related U.S. Application Data

(60) Provisional application No. 62/524,845, filed on Jun. 26, 2017.

(51) Int. Cl.
| | |
|---|---|
| *B60N 2/20* | (2006.01) |
| *B60N 2/22* | (2006.01) |
| *B60N 2/02* | (2006.01) |
| *B60N 2/005* | (2006.01) |
| *F03G 7/06* | (2006.01) |

(52) U.S. Cl.
CPC ........... *B60N 2/2227* (2013.01); *B60N 2/005* (2013.01); *B60N 2/0244* (2013.01); *B60N 2/20* (2013.01); *B60N 2/22* (2013.01); *F03G 7/065* (2013.01)

(58) Field of Classification Search
CPC ........ B60N 2/22; B60N 2/2227; B60N 2/005; B60N 2/0244; B60N 2/20; F03G 7/065
USPC .............. 297/361.1–376, 378.12, 378.14
See application file for complete search history.

(56) References Cited

U.S. PATENT DOCUMENTS

| | | | |
|---|---|---|---|
| 7,547,070 B2 | 6/2009 | Nathan | |
| 7,709,995 B2 | 5/2010 | Hanlon | |
| 7,758,121 B2 | 7/2010 | Browne | |
| 7,775,596 B2 | 8/2010 | Kennedy | |
| 7,793,497 B2 | 9/2010 | Alacqua | |
| 7,931,337 B2 | 4/2011 | Lawall | |
| 8,038,215 B2 | 10/2011 | Di Giusto | |
| 8,436,571 B2 | 5/2013 | Hao | |
| 8,966,893 B2 | 3/2015 | Mance | |
| 8,998,320 B2 | 4/2015 | Mankame | |
| 9,630,560 B2 | 4/2017 | Alacqua | |
| 10,232,743 B2 * | 3/2019 | Ketels | F03G 7/065 |
| 2005/0023086 A1 | 2/2005 | Szilagyi | |
| 2005/0062329 A1 | 3/2005 | Alacqua | |
| 2006/0172557 A1 | 8/2006 | He | |
| 2008/0129098 A1 * | 6/2008 | Kennedy | B60N 2/20 297/354.1 |
| 2017/0225592 A1 | 8/2017 | Ferre | |
| 2017/0234306 A1 | 8/2017 | Vanden Aker | |
| 2018/0105069 A1 * | 4/2018 | Nasca | B60N 2/0228 |

* cited by examiner

*Primary Examiner* — Rodney B White
(74) *Attorney, Agent, or Firm* — Barnes & Thornburg LLP

(57) ABSTRACT

An occupant support adapted for use in a vehicle includes a seat bottom coupled to a floor of the vehicle and a seat back configured to pivot about a seat-back pivot axis relative to the seat bottom. The occupant support further includes a seatback-motion controller configured to control movement of the seat back relative to the seat bottom between a blocked arrangement and a freed arrangement.

16 Claims, 3 Drawing Sheets

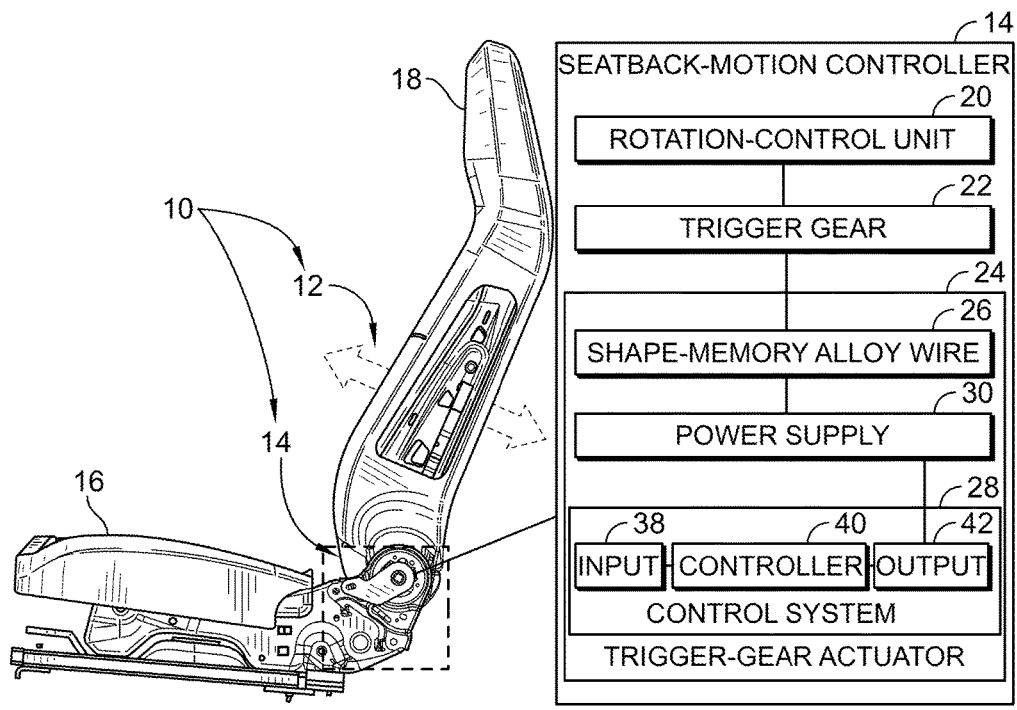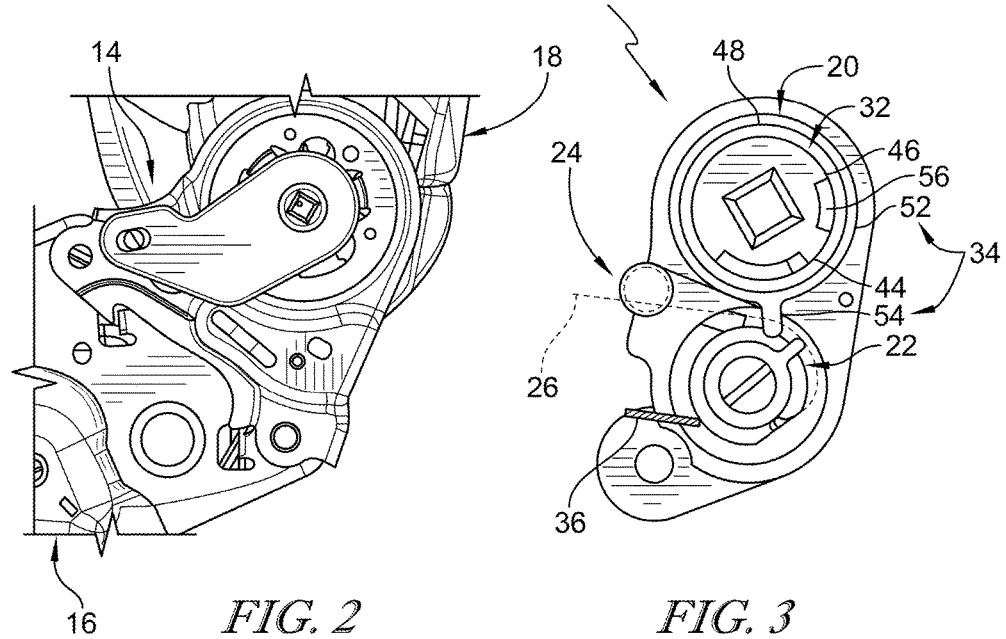

US 10,479,234 B2

ACTUATOR FOR AN OCCUPANT SUPPORT

PRIORITY CLAIM

This application claims priority under 35 U.S.C. § 119(e) to U.S. Provisional Application Ser. No. 62/524,845, filed Jun. 26, 2017, which is expressly incorporated by reference herein.

BACKGROUND

The present disclosure relates to recliner actuators, and particularly to recliner actuators adapted for use with occupant supports. More particularly, the present disclosure relates to recliner actuators for controlling occupant supports having reclining seat backs for use in vehicles.

SUMMARY

According to the present disclosure, a vehicle includes an occupant support mounted to a floor of the vehicle. The occupant support includes a seat bottom coupled to the floor of the vehicle and a seat back coupled to the seat bottom for movement about a seat-back pivot axis relative to the seat bottom between an upright position and a folded-forward position. The occupant support further includes a seatback-motion controller configured to control movement of the seat back about the seat-back pivot axis relative to the seat bottom.

In illustrative embodiments, the occupant support includes a seatback-motion controller configured to move selectively a rotation-control unit between a blocked arrangement and a freed arrangement in response to an input. In the blocked arrangement, the seat back is blocked from pivoting relative to the seat bottom. In the freed arrangement, the seat back is allowed to pivot relative to the seat bottom.

In illustrative embodiments, the seatback-motion controller includes a rotation-control unit coupled to the seat back to move relative to the seat back, a trigger gear coupled to the rotation-control unit to move relative to the rotation control-unit, and a trigger-gear actuator coupled to the trigger gear to move the trigger gear.

In illustrative embodiments, the trigger gear actuator includes a shape-memory alloy wire, a power supply coupled to the shape-memory alloy wire and configured to provide selectively power to the shape-memory alloy wire, and a control system coupled to the power supply and configured to apply varying amounts of power from the power supply to the shape-memory alloy wire to cause the shape-memory alloy wire to change between a plurality of lengths in response to receipt of an input to the control system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of an occupant support in accordance with the present disclosure showing that the occupant support includes a vehicle seat including a seat back and a seat bottom and a seatback-motion controller arranged to extend between and interconnect the seat back and the seat bottom;

FIG. 2 is a partial perspective view of the occupant support of FIG. 1 showing the seat back-motion controller includes a rotation-control unit coupled to the seat back to move relative to the seat back and change between a blocked arrangement as suggested in FIG. 4 and a freed arrangement as suggested in FIG. 5.

FIG. 3 is a view similar to FIG. 2 showing that the seatback-motion controller also includes a trigger gear coupled to the rotation-control unit to move relative to the rotation-control unit and a trigger actuator coupled to the trigger gear to move the trigger gear between a plurality of positions as suggested in FIGS. 4-7;

DETAILED DESCRIPTION

Figures 4, 5, 6, 7:
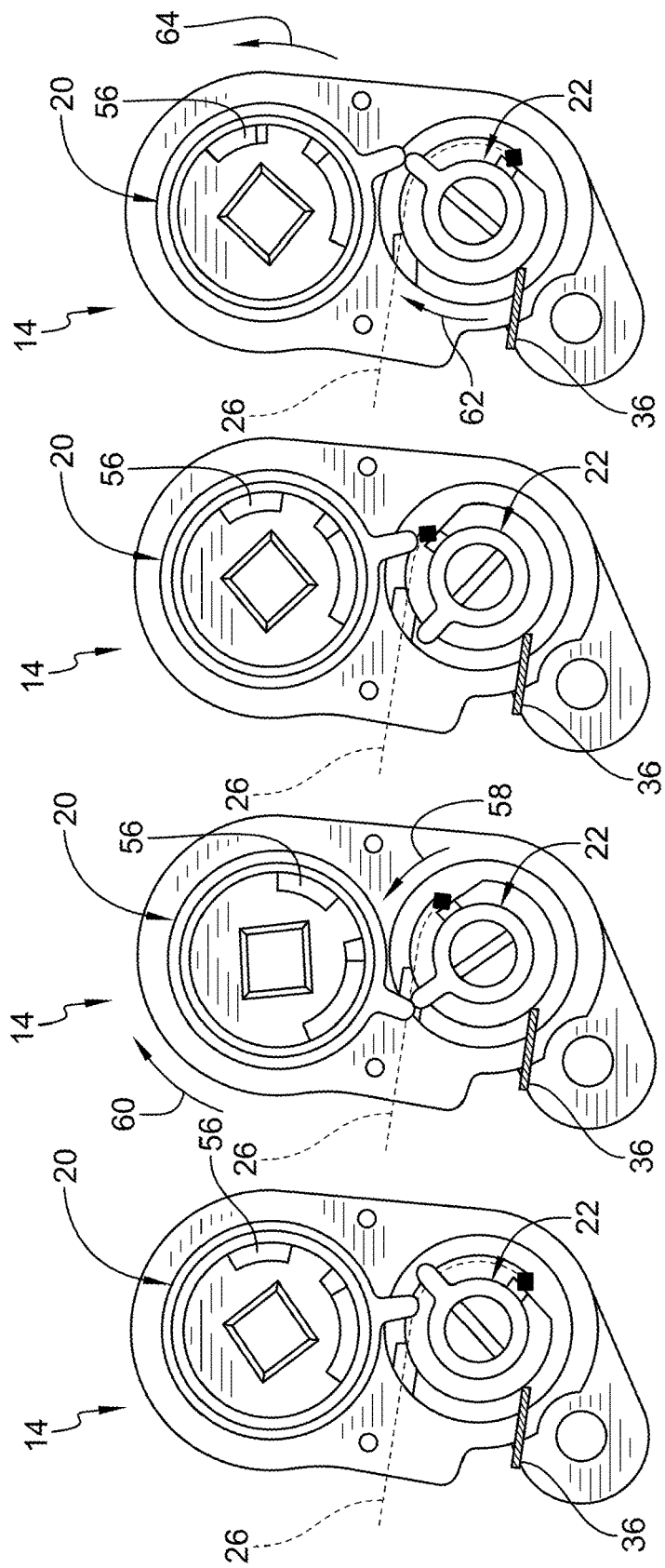
FIG. 4 is a diagrammatic view of the seat-back-motion controller of FIG. 2 showing that seat back-motion controller is in the locked mode wherein the rotation-control unit is in the blocked arrangement in which movement of the seat back relative to the seat bottom is blocked when the trigger gear is in a first position and the shape-memory alloy wire has a length $L_o$.
FIG. 5 is a view similar to FIG. 4 showing that seat back-motion controller is in the unlocked mode in which the rotation-control unit is in the freed arrangement allowing movement of the seat back relative to the seat bottom and showing the trigger gear changed from the first position to a second position and the shape-memory alloy wire has a length $L_2$.
FIG. 6 is a view similar to FIG. 5 showing that seat back-motion controller in the re-locking mode in which that the trigger gear changes from the second position to a third position that allows the rotation-control unit to change from the freed arrangement toward the blocked arrangement and the shape-memory alloy wire has a length $L_3$.
FIG. 7 is a view similar to FIG. 6 showing that seat back-motion controller in the re-setting mode in which the trigger gear has changed from the third position to a fourth position in which the rotation-control unit is allowed to change back to the blocked arrangement.
Figure 8:
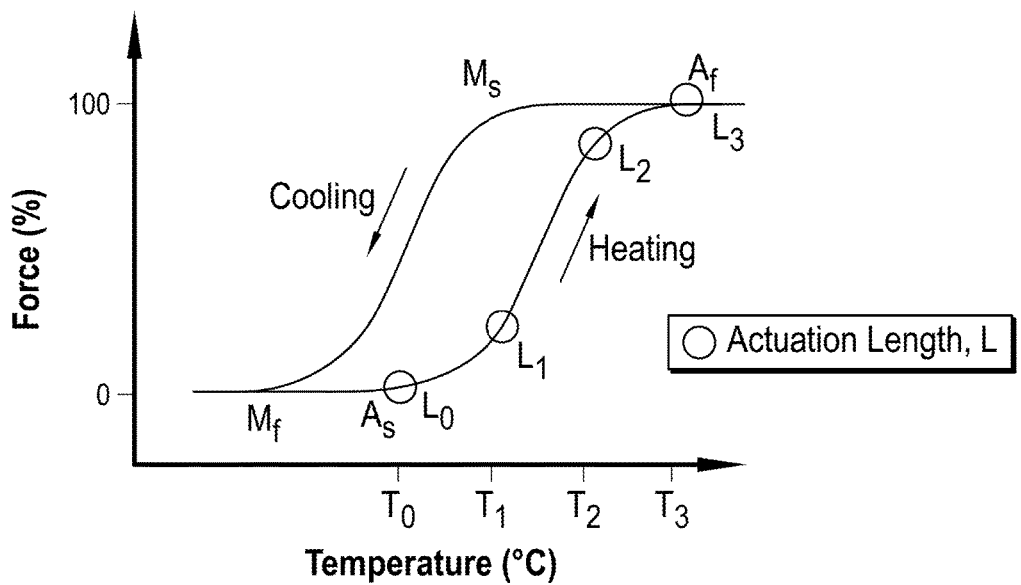
FIG. 8 is a graph showing the trigger actuator moving the trigger gear between the first, second, and third positions as it is heated to different temperatures.
Figure 9:
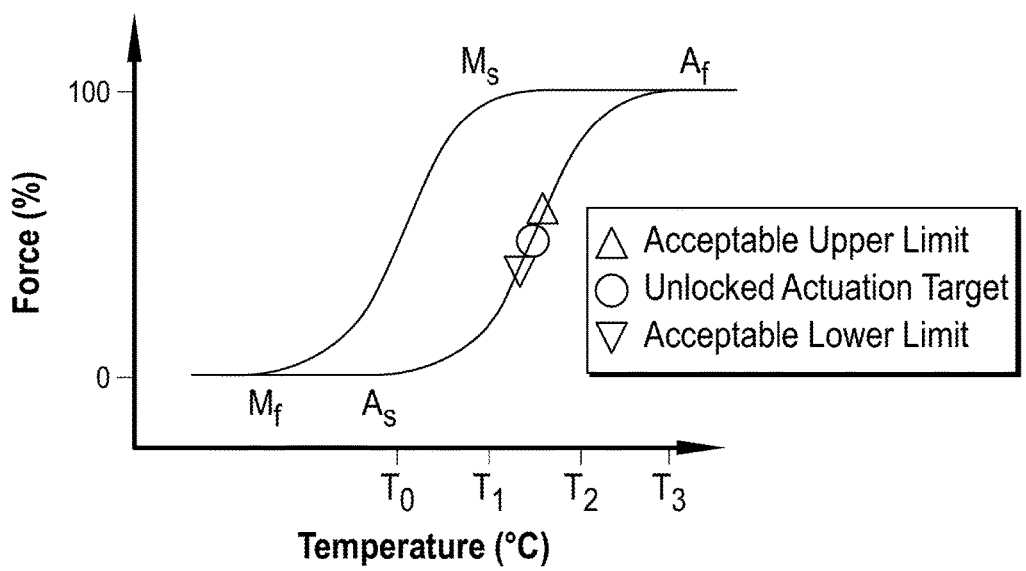
FIG. 9 is a graph similar to FIG. 8 showing that a length of the shape-memory alloy wire may have upper and lower limits associated with each position of the trigger gear.

An occupant support 10 is shown in FIGS. 1 and 2. The occupant support 10 includes a vehicle seat 12 and a seatback-motion controller 14 as shown in FIG. 1. The vehicle seat 12 includes a seat bottom 16 and a seat back 18 arranged to extend upwardly away from the seat bottom 16 and move relative to the seat bottom 16. The seatback-motion controller 14 is arranged to extend between and interconnect the seat back 18 and the seat bottom 16 as shown in FIGS. 1-2. The seatback-motion controller 14 controls whether the seat back 16 to able move relative to the seat bottom 16 when a user provides an input to activate the seatback-motion controller 14.

The seatback-motion controller 14 includes a rotation-control unit 20, a trigger gear 22, and a trigger-gear actuator 24 as shown in FIG. 3. The rotation-control unit 20 is coupled to the seat back 18 and allows selective rotation of the seat back 18 relative to the seat bottom 16. The trigger gear 22 is moved by the trigger-gear actuator 24 and causes the rotation-control unit to move between a blocked arrangement as shown in FIG. 4 and freed arrangement as shown in FIG. 5. In other examples, the blocked arrangement may also be referred to as the locked arrangement and the freed arrangement may be referred to as the un-locked arrangement.

The trigger gear 22 is coupled to the rotation-control unit 20 to move relative to the rotation-control unit 20 between a first position as shown in FIG. 4, a second position as shown in FIG. 5, a third position as shown in FIG. 6, and a fourth position as shown in FIG. 7. In other examples the first position may also be referred to as the set position, the second position may be referred to as the brace position, and the third position may be referred to as the retrigger position. The trigger-gear actuator 24 is coupled to the trigger gear 22 to move the trigger gear 22 between the first, second, third, and fourth positions as shown in FIGS. 4-6.

The trigger-gear actuator 24 includes a shape-memory alloy wire 26, a control system 28, and a power supply 30 as shown in FIG. 1. The trigger-gear actuator 24 is coupled to the trigger gear 22 to move the trigger gear 22 in response to changes in length of the shape-memory alloy wire 26 between a first length $L_o$ as shown in FIG. 4, a relatively smaller second length $L_2$ as shown in FIG. 5, a relatively smaller third length $L_3$ as shown in FIG. 6, and a fourth length $L_4$ which is less than the first length $L_2$ and greater than the second and third lengths $L_2$ and $L_3$ as shown in FIG. 7. The power supply 30 is coupled to the shape-memory alloy wire 26 and is configured to provide selectively power to the shape-memory alloy wire 26 to heat the shape-memory alloy wire 26. The control system 28 is coupled to the power supply 30 and is configured to apply varying amounts of power from the power supply 30 to the shape-memory alloy wire 26 to cause the shape-memory alloy wire 26 to change between the first, second, and third lengths in response to receipt of an input to the control system 28 in response to inputs received by the control system 28.

The input can be, for example, a user input such as activating a switch such as, a button, a software based switch such as a touchscreen, or any other suitable alternative. The input can also be for example a sensor such as, a potentiometer coupled to the seat back 18 to sense a relative rotational position of the seat back 18 relative to the seat bottom 16.

The potentiometer may be used to determine and track the orientation of rotation control unit 20 or the trigger gear 22. In some cases, the potentiometer acts as a temperature-regulating element. The potentiometer precisely tracks the orientation of the rotation control unit 20 or the trigger gear 22 and gives feedback to the control system 28 coupled to the power supply 30 to cause the power supply 30 coupled to the shape-memory alloy wire 26 to regulate the temperature of the shape-memory alloy wire 26 accordingly.

A method of using the seatback-motion controller 14 includes several steps. The method begins with the rotation-control unit in the blocked arrangement as shown in FIG. 4. A user desiring to rotate the seatback continues the method by providing an input to the control system 28 which causes a first amount of power to flow from the power supply 30 to the shape-memory alloy wire 26 and causes the shape-memory alloy wire 26 to shrink to the relatively smaller second length as shown in FIG. 5. The changing of the length of the shape-memory alloy wire 26 from the first length $L_o$ to the second length $L_2$ causes the trigger gear 22 to engage and actuate the rotation-control unit 20 and move the rotation-control unit 20 to the freed arrangement as shown in FIG. 5.

In the next step of this method, the user desiring to re-block the seat back 18 from rotating in a chosen position relative to the seat bottom continues the method by providing an input to the control system 28 which causes a greater second amount of power to flow from the power supply 30 to the shape-memory alloy wire 26. The greater second amount of power provided to the shape-memory alloy wire 26 causes the shape-memory alloy wire 26 to shrink to the relatively smaller third length $L_3$ as shown in FIG. 6. The changing of the length of the shape-memory allow wire 26 from the second length $L_2$ to the third length $L_3$ causes the trigger gear 22 to engage and actuate the rotation-control unit 20 and move the rotation-control unit toward the blocked arrangement as shown in FIG. 6.

In the last step of the method, the user desiring to block the seat back 18 from rotating in the chosen position relative to the seat bottom stops providing an input to the control system 28 which causes power to stop flowing from the power supply 30 to the shape-memory alloy wire 26. The stopping of power from the controller 42 to the shape-memory alloy wire 26 causes the shape-memory alloy wire 26 to grow in length. A bias spring 36 coupled to the trigger gear is biased toward the blocked arrangement and urges the rotation-control unit to change back to the blocked arrangement as suggested in FIG. 7.

The seatback-motion controller 14 includes the rotation-control unit 20, the trigger gear 22, and the trigger-gear actuator 24 as shown in FIG. 3. The rotation-control unit 20 is coupled to the seat back 18 and allows selective rotation of the seat back 18 relative to the seat bottom 16. The trigger gear 22 is moved by the trigger-gear actuator 24 and causes the rotation-control unit to move between the blocked arrangement of FIG. 4 and the freed arrangement of FIG. 5.

The trigger-gear actuator 24 includes a shape-memory alloy wire 26, a control system 28, and a power supply 30 as shown in FIG. 1. The trigger-gear actuator 24 is coupled to the trigger gear 22 to move the trigger gear 22 in response to changes in length of the shape-memory alloy wire 26 between the first length $L_o$ as shown in FIG. 4, the relatively smaller second length $L_2$ as shown in FIG. 5, the relatively smaller third length $L_3$ as shown in FIG. 6, and the fourth length $L_4$ which is less than the first length and greater than the second and third lengths as shown in FIG. 7. In some examples, the fourth length $L_4$ may be about equal to the first length $L_o$. The power supply 30 is coupled to the shape-memory alloy wire 26 and is configured to provide selectively power to the shape-memory alloy wire 26. The control system 28 is coupled to the power supply 30 and is configured to apply varying amounts of power from the power supply 30 to the shape-memory alloy wire 26 to cause the shape-memory alloy wire 26 to change between the first, second, and third lengths in response to receipt of an input to the control system 28.

In some embodiments, the shape-memory alloy wire is a smart shape memory alloy (S-SMA), such as wire manufactured by Smarter Alloys™ of Waterloo, Ontario to use its Multiple Memory Material™. The S-SMA permits multiple positions to be programmed in a single wire 26 at distinct temperatures so that at multiple temperatures the single wire may be driven to a different shape, or tension, thereby driving the trigger gear 22 to various positions. In other words, the S-SMA may also be nitinol that has been processed to have a plurality of transition phases and corresponding transition positions.

The control system 28 includes an input 38, an output 40, and a controller 42 as shown in FIG. 1. The controller 42 is coupled to the seatback-motion controller 14 and is configured to receive the input 38 from the user and provide the output 40 to the shape-memory alloy wire 26. The input 38 and output 40 are coupled to the controller 42. In one example, the output 40 is coupled to the power supply 30 and configured to cause the power supply 30 to provide power at various amounts as commanded by the controller 42.

The output 40 may be a first amount of power to be supplied to the shape-memory alloy wire 26 to cause the shape-memory alloy wire 26 to have a temperature which is greater than an ambient temperature of an environment surrounding the occupant support 10 to change from having the first length $L_o$ as shown in FIG. 4 to having the second length $L_2$ as shown in FIG. 5. In another example, the output 40 may be a relatively greater second amount of power to be supplied to the shape-memory alloy wire 26 to cause the shape-memory alloy wire 26 to change from having the second length $L_2$ as shown in FIG. 5 to the third length $L_3$ as shown in FIG. 6. In another example, the input 38 may be withheld from the controller 42 to stop the control system 28 from providing power to the shape-memory alloy wire 26 to cause the trigger gear 22 to move towards the first position $L_o$ from one of the second and third positions $L_2$ and $L_3$.

The rotation-control unit 20 includes a recline unit 32, a transmission gear 34, and a bias spring 36. The recline unit 32 is movable between a blocking position as shown in FIG. 4 and a rotating position as shown in FIG. 5. The recline unit 32 is in the blocking position when the movement of the seat back 18 relative to the seat bottom 16 is blocked. In other cases, the blocking position may also be referred to as the default position. The recline unit 32 is in the rotating position when the movement of the seat back 18 relative to the seat bottom 16 is permitted. In other cases, the rotating position may also be referred to as the lock-release position. The transmission gear 34 is coupled to the recline unit 32 to move therewith and relative to the recline unit 32. The transmission gear 34 engages and moves the recline unit 32 from the blocking position to the rotating position in response to the trigger gear 22 engaging the transmission gear 34 as the trigger gear 22 moves from the first position as shown in FIG. 4 to the second position as shown in FIG. 5. The bias spring 36 is configured to provide a bias force to the rotation-control unit to urge the rotation-control unit to be biased toward the blocked arrangement.

In another example, the trigger-gear actuator 24 may include a bias spring 36. The bias spring 36 is configured to provide a bias force to the trigger gear 22 to cause the trigger gear 22 to be biased to move toward the first position.

The recline unit 32 includes a drive tab 44, a drive body 46, and a recliner 48. The drive tab 44 is coupled to the drive body 46 and is arranged to extend into a lost-motion slot 56 included in the transmission gear 34.

The transmission gear 34 includes a tooth carrier 52 and a tooth 54 as shown in FIGS. 3-7. The tooth carrier 52 is configured to engage selectively the recline unit 32. The tooth 54 is coupled to the tooth carrier 52 and arranged to extend outwardly away from the tooth carrier 52 to engage the trigger gear 22 as the trigger gear 22 moves from the first position to the second position.

The tooth carrier 52 is formed to include the lost-motion slot 56. The drive tab 44 included in the recline unit 32 is arranged to extend into the lost-motion slot 56. The drive tab 44 is spaced apart from either end of the lost-motion slot when as the transmission gear 34 moves relative to the recline unit 32.

The trigger gear 22 is coupled to the rotation-control unit 20 to move relative to the rotation-control unit 20 between the first position of FIG. 4, the second position of FIG. 5, the third position of FIG. 6, and the fourth position of FIG. 7. In the first position, the rotation-control unit 20 is blocked from changing from the blocked arrangement to the freed arrangement. In the second position, the trigger gear 22 has rotated in the first direction 58, engaging and actuating the rotation-control unit 20 to move the rotation-control unit 20 in a clockwise direction 60 to change to the freed arrangement. In the third position, the trigger gear 22 had continued to rotate in the first direction 58 from the second position to the third position to cause the transmission gear 34 to engage and move the recline unit 32 from the rotating position toward the blocking position so that the rotation-control unit changes from the freed arrangement toward the blocked arrangement. In the fourth position, the trigger gear has rotated in a second direction 62 opposite the first direction, engaging the transmission gear 34 to move the transmission gear 34 in a counter-clockwise direction 64 relative to the recline unit without moving the recline unit.

Reference is hereby made to U.S. Non-Provisional application Ser. No. 15/808,226 filed Nov. 9, 2017 and entitled RECLINER ACTUATOR FOR VEHICLE SEAT for disclosure relating to use recliner actuators, which application is hereby incorporated in its entirety herein.

The following numbered clauses include embodiments that are contemplated and non-limiting:

Clause 1. An occupant support comprising a vehicle seat including a seat bottom and a seat back coupled to the seat bottom to extend upwardly away from the seat bottom and move relative to the seat bottom.

Clause 2. The occupant support of clause 1, any other clause, or combination of clauses, further comprising a seatback-motion controller arranged to extend between and interconnect the seat back and the seat bottom.

Clause 3. The occupant support of clause 2, any other clause, or combination of clauses, wherein the seatback-motion controller includes a rotation-control unit coupled to the seat back to move relative to the seat back and change between a blocked arrangement in which movement of the seat back relative to the seat bottom is blocked and a freed arrangement in which movement of the seat back relative to the seat bottom is permitted.

Clause 4. The occupant support of clause 3, any other clause, or combination of clauses, wherein the seatback-motion controller further includes a trigger gear coupled to the rotation-control unit to move relative to the rotation control-unit between a first position in which the rotation-control unit is blocked from changing from the blocked arrangement to the freed arrangement, a second position in which the trigger gear has rotated in a first direction to cause the rotation-control unit to change to the freed arrangement, and a third position in which the trigger gear rotates further in the first direction to allow the rotation-control unit to change to the blocked arrangement.

Clause 5. The occupant support of clause 4, any other clause, or combination of clauses, wherein the seatback-motion controller further includes a trigger-gear actuator coupled to the trigger gear to move the trigger gear between the first, second, and third positions.

Clause 6. The occupant support of clause 6, any other clause, or combination of clauses, wherein the trigger-gear actuator includes a shape-memory alloy wire coupled to the trigger gear to move the trigger gear in response to changes in length of the shape-memory alloy wire between a first length associated with the first position, a relatively smaller second length associated with the second position, and a relatively smaller third length associated with the third position.

Clause 7. The occupant support of clause 6, any other clause, or combination of clauses, wherein the trigger-gear actuator further includes a power supply coupled to the shape-memory alloy wire and configured to provide selectively power to the shape-memory alloy wire.

Clause 8. The occupant support of clause 7, any other clause, or combination of clauses, wherein the trigger-gear actuator includes a control system coupled to the power supply and configured to apply varying amounts of power from the power supply to the shape-memory alloy wire to cause the shape-memory alloy wire to change between the first, second, and third lengths in response to receipt of an input to the control system.

Clause 9. The occupant support of claim 8, any other clause, or combination of clauses, where in the rotational-control unit includes a recline unit movable between a rotating position in which movement of the seat back relative to the seat bottom is permitted and a blocking position in which movement of the seat back relative to the seat bottom is blocked and an outer transmission gear coupled to the recline unit to move therewith and relative to the recline unit and outer transmission gear engages and moves the recline unit from the blocking position to the rotating position in response to the trigger gear engaging the transmission gear as the trigger gear moves from the first position to the second position.

Clause 10. The occupant support of claim 9, any other clause, or combination of clauses, wherein the trigger gear rotates in the first direction from the second position to the third position to cause the outer transmission gear to engage and move the recline unit from the rotating position to the blocking position so that the rotation-control unit changes from the freed arrangement to the blocked arrangement.

Clause 11. The occupant support of claim 10, any other clause, or combination of clauses, wherein the trigger gear rotates in a second direction opposite the first direction from the third position to a fourth position in which the trigger gear engages the outer transmission gear to move the outer transmission gear in a counter-clockwise direction relative to the recline unit without moving the recline unit.

Clause 12. The occupant support of claim 11, any other clause, or combination of clauses, wherein the shape-memory alloy wire has a fourth length when the trigger gear is in the fourth position, the fourth length is less than the first length and greater than the second and third lengths.

Clause 13. The occupant support of claim 9, any other clause, or combination of clauses, wherein the transmission gear includes a tooth carrier configured to engage selectively the recline unit, a tooth coupled to the tooth carrier and arranged to extend outwardly away from the tooth carrier to engage the trigger gear as the trigger gear moves from the first position to the second position.

Clause 14. The occupant support of claim 13, any other clause, or combination of clauses, wherein the tooth carrier is formed to include a lost-motion slot and a drive tab included in the recline unit is arranged to extend into the lost-motion slot.

Clause 15. The occupant support of claim 14, any other clause, or combination of clauses, wherein the drive tab is spaced apart from either end of the lost-motion slot when as the transmission gear moves relative to the recline unit.

Clause 16. The occupant support of claim 8, any other clause, or combination of clauses, wherein the control system causes a first amount of power to be supplied to the shape-memory alloy wire to cause the shape-memory alloy wire to change from having the first length to having the second length.

Clause 17. The occupant support of claim 16, any other clause, or combination of clauses, wherein the control system causes a relatively greater second amount of power to be supplied to the shape-memory alloy wire to cause the shape-memory alloy wire to change from having the second length to the third length.

Clause 18. The occupant support of claim 17, any other clause, or combination of clauses, wherein the trigger gear rotates in a second direction opposite the first direction from the third position to a fourth position in which the trigger gear engages the outer transmission gear to move the outer transmission gear in a counter-clockwise direction relative to the recline unit without moving the recline unit.

Clause 19. The occupant support of claim 18, any other clause, or combination of clauses, wherein the control system stops power from flowing to the shape-memory alloy wire to cause the trigger gear to move towards the first position from one of the second and third positions.

Clause 20. The occupant support of claim 19, any other clause, or combination of clauses, wherein the first amount of power causes the shape-memory alloy wire to have a temperature which is greater than an ambient temperature of an environment surrounding the occupant support.

Clause 21. The occupant support of claim 8, any other clause, or combination of clauses, wherein the rotation-control unit includes a bias spring configured to provide a bias force to the rotation-control unit to cause the rotation-control unit to be biased toward the blocked arrangement.

Clause 22. The occupant support of claim 8, any other clause, or combination of clauses, wherein the trigger-gear actuator includes a bias spring configured to provide a bias force to the trigger gear to cause the trigger gear to be biased to move toward the first position.

Clause 23. A motion controller for use between two components of a vehicle seat, the motion controller comprising a rotation-control unit configured to change between a blocked arrangement in which movement of a first component relative to second component is blocked and a freed arrangement in which movement of the first component relative to the first component is permitted, a trigger gear coupled to the rotation-control unit to move relative to the rotation-control unit between a first position in which the rotation-control unit is blocked from changing from the blocked arrangement to the freed arrangement, a second position in which the trigger gear has rotated in a first direction to cause the rotation-control unit to change to the freed arrangement, and a third position in which the trigger gear rotates further in the first direction to allow the rotation-control unit to change to the blocked arrangement, and a trigger actuator coupled to the trigger gear to move the trigger gear between the first, second, and third positions, wherein the trigger actuator includes a shape-memory alloy wire coupled to the trigger gear to move the trigger gear in response to changes in length of the shape-memory alloy wire between a first length associated with the first position, a relatively smaller second length associated with the second position, and a relatively smaller third length associated with the third position, a power supply coupled to the shape-memory alloy wire and configured to provide selectively power to the shape-memory alloy wire, and a control system coupled to the power supply and configured to apply varying amounts of power from the power supply to the shape-memory alloy wire to cause the shape-memory alloy wire to change between the first, second, and third lengths in response to receipt of an input to the control system.

The invention claimed is:

1. An occupant support comprising
a vehicle seat including a seat bottom and a seat back coupled to the seat bottom to extend upwardly away from the seat bottom and move relative to the seat bottom,
a seatback-motion controller arranged to extend between and interconnect the seat back and the seat bottom, the seatback-motion controller including a rotation-control unit coupled to the seat back to move relative to the seat back and change between a blocked arrangement in which movement of the seat back relative to the seat bottom is blocked and a freed arrangement in which movement of the seat back relative to the seat bottom is permitted, a trigger gear coupled to the rotation-control unit to move relative to the rotation control-unit between a first position in which the rotation-control unit is blocked from changing from the blocked arrangement to the freed arrangement, a second position in which the trigger gear has rotated in a first direction to cause the rotation-control unit to change to the freed arrangement, and a third position in which the trigger gear rotates further in the first direction to allow the rotation-control unit to change to the blocked arrangement, and a trigger-gear actuator coupled to the trigger gear to move the trigger gear between the first, second, and third positions,
wherein the trigger-gear actuator includes a shape-memory alloy wire coupled to the trigger gear to move the trigger gear in response to changes in length of the shape-memory alloy wire between a first length associated with the first position, a relatively smaller second length associated with the second position, and a relatively smaller third length associated with the third position, a power supply coupled to the shape-memory alloy wire and configured to selectively provide power to the shape-memory alloy wire, and a control system coupled to the power supply and configured to apply varying amounts of power from the power supply to the shape-memory alloy wire to cause the shape-memory alloy wire to change between the first, second, and third lengths in response to receipt of an input to the control system.

2. The occupant support of claim 1, where in the rotational-control unit includes a recline unit movable between a rotating position in which movement of the seat back relative to the seat bottom is permitted and a blocking position in which movement of the seat back relative to the seat bottom is blocked and an outer transmission gear coupled to the recline unit to move therewith and relative to the recline unit and outer transmission gear engages and moves the recline unit from the blocking position to the rotating position in response to the trigger gear engaging the transmission gear as the trigger gear moves from the first position to the second position.

3. The occupant support of claim 2, wherein the trigger gear rotates in the first direction from the second position to the third position to cause the outer transmission gear to engage and move the recline unit from the rotating position to the blocking position so that the rotation-control unit changes from the freed arrangement to the blocked arrangement.

4. The occupant support of claim 3, wherein the trigger gear rotates in a second direction opposite the first direction from the third position to a fourth position in which the trigger gear engages the outer transmission gear to move the outer transmission gear in a counter-clockwise direction relative to the recline unit without moving the recline unit.

5. The occupant support of claim 4, wherein the shape-memory alloy wire has a fourth length when the trigger gear is in the fourth position, the fourth length is less than the first length and greater than the second and third lengths.

6. The occupant support of claim 2, wherein the transmission gear includes a tooth carrier configured to engage selectively the recline unit, a tooth coupled to the tooth carrier and arranged to extend outwardly away from the tooth carrier to engage the trigger gear as the trigger gear moves from the first position to the second position.

7. The occupant support of claim 6, wherein the tooth carrier is formed to include a lost-motion slot and a drive tab included in the recline unit is arranged to extend into the lost-motion slot.

8. The occupant support of claim 7, wherein the drive tab is spaced apart from either end of the lost-motion slot when as the transmission gear moves relative to the recline unit.

9. The occupant support of claim 1, wherein the control system causes a first amount of power to be supplied to the shape-memory alloy wire to cause the shape-memory alloy wire to change from having the first length to having the second length.

10. The occupant support of claim 9, wherein the control system causes a relatively greater second amount of power to be supplied to the shape-memory alloy wire to cause the shape-memory alloy wire to change from having the second length to the third length.

11. The occupant support of claim 10, wherein the trigger gear rotates in a second direction opposite the first direction from the third position to a fourth position in which the trigger gear engages the outer transmission gear to move the outer transmission gear in a counter-clockwise direction relative to the recline unit without moving the recline unit.

12. The occupant support of claim 11, wherein the control system stops power from flowing to the shape-memory alloy wire to cause the trigger gear to move towards the first position from one of the second and third positions.

13. The occupant support of claim 12, wherein the first amount of power causes the shape-memory alloy wire to have a temperature which is greater than an ambient temperature of an environment surrounding the occupant support.

14. The occupant support of claim 1, wherein the rotation-control unit includes a bias spring configured to provide a bias force to the rotation-control unit to cause the rotation-control unit to be biased toward the blocked arrangement.

15. The occupant support of claim 1, wherein the trigger-gear actuator includes a bias spring configured to provide a bias force to the trigger gear to cause the trigger gear to be biased to move toward the first position.

16. A motion controller for use between two components of a vehicle seat, the motion controller comprising a rotation-control unit configured to change between a blocked arrangement in which movement of a first component relative to second component is blocked and a freed arrangement in which movement of the first component relative to the first component is permitted, a trigger gear coupled to the rotation-control unit to move relative to the rotation-control unit between a first position in which the rotation-control unit is blocked from changing from the blocked arrangement to the freed arrangement, a second position in which the trigger gear has rotated in a first direction to cause the rotation-control unit to change to the freed arrangement, and a third position in which the trigger gear rotates further in the first direction to allow the rotation-control unit to change to the blocked arrangement, and a trigger actuator coupled to the trigger gear to move the trigger gear between the first, second, and third positions, wherein the trigger actuator includes a shape-memory alloy wire coupled to the trigger gear to move the trigger gear in response to changes in length of the shape-memory alloy wire between a first length associated with the first position, a relatively smaller second length associated with the second position, and a relatively smaller third length associated with the third position, a power supply coupled to the shape-memory alloy wire and configured to selectively provide power to the shape-memory alloy wire, and a control system coupled to the power supply and configured to apply varying amounts of power from the power supply to the shape-memory alloy wire to cause the shape-memory alloy wire to change between the first, second, and third lengths in response to receipt of an input to the control system.

\* \* \* \* \*